United States Patent [19]

Diel

[11] Patent Number: 5,500,779
[45] Date of Patent: Mar. 19, 1996

[54] DISK DRIVE MEMORY CARD ELECTRICAL INTERCONNECT

[75] Inventor: Mark Diel, Boulder, Colo.

[73] Assignee: Maxtor Corporation, San Jose, Calif.

[21] Appl. No.: 209,292

[22] Filed: Mar. 9, 1994

[51] Int. Cl.⁶ .................................................. G11B 5/012
[52] U.S. Cl. ............................................. 360/97.01
[58] Field of Search ........................................ 360/97.01

[56] References Cited

U.S. PATENT DOCUMENTS 4,639,863  1/1987  Harrison ............................. 360/98.01
4,985,793  1/1991  Anderson ............................. 360/97.01
5,025,335  6/1991  Stefansky ............................ 360/97.01

*Primary Examiner*—A. J. Heinz
*Attorney, Agent, or Firm*—Sheridan Ross & McIntosh

[57] ABSTRACT

A hard disk drive frame which has a plurality of spring shaped contacts that electrically couple a printed circuit board to the flexible circuit board of an actuator arm assembly. The spring shaped contacts are mounted to the frame and extend from the frame in opposite directions into the printed circuit board area and held-disk assembly area. The spring shaped contacts are biased to engage and remain in contact with conductive pads formed on the flexible circuit board and printed circuit board when each are assembled within the hard disk drive.

8 Claims, 2 Drawing Sheets

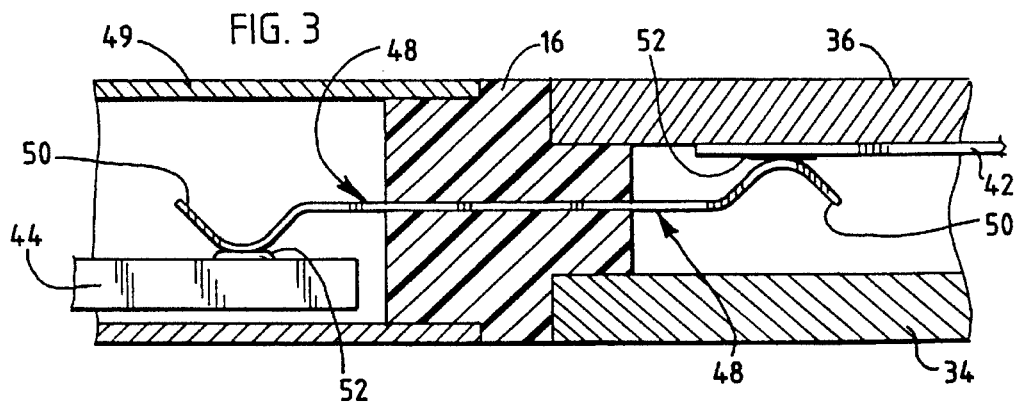
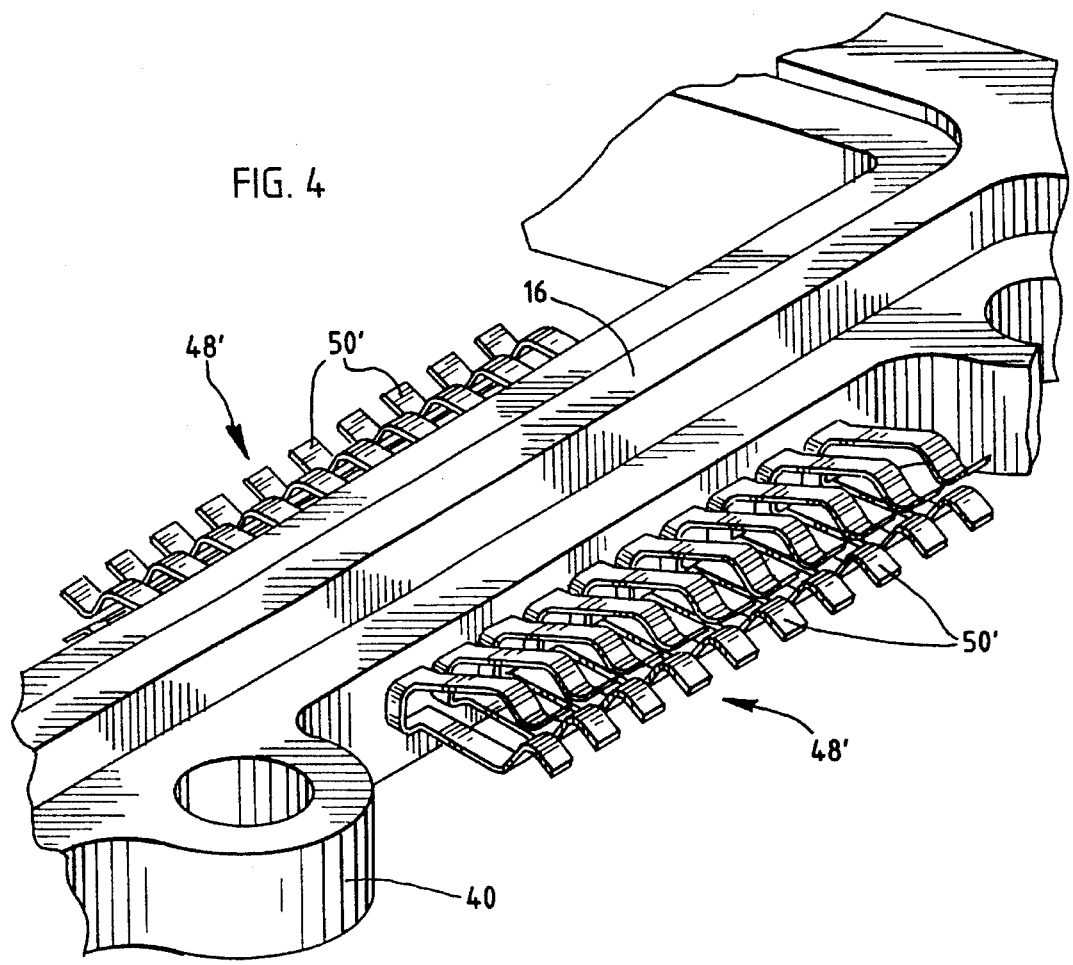

5,500,779

DISK DRIVE MEMORY CARD ELECTRICAL INTERCONNECT

BACKGROUND OF THE INVENTION

1. Field of the Invention

The present invention relates to a connector that couples a printed circuit board to the spin motor and actuator arm assembly of a hard disk drive.

2. Description of Related Art

Hard disk drives contain a transducer which can magnetize and sense the magnetic field of a rotating disk. The transducer is typically located at the end of an actuator arm. The actuator arm has a voice coil motor which moves the transducer across the surface of the disk.

Hard disk drives also contain a number of electronic circuits that control the operation of the drive. The electronic circuits are mounted onto a printed circuit board. The transducer is typically coupled to the printed circuit board by a flexible circuit board. The flexible circuit board has leads that are soldered to corresponding pads of the printed circuit board. Soldering leads increases the assembly time of the drive and the cost of each unit. The solder may also expose the disk to contaminants which may effect the operation of the drive. Additionally, the solder must be reflowed to repair the actuator arm, printed circuit board or any components on the circuit board. Reflowing the solder is both time consuming and again increases the possibility of contaminants being introduced to the drive. It would therefore be desirable to have a disk drive which couples an actuator arm assembly to a printed circuit board without hard wiring together the two members.

SUMMARY OF THE INVENTION

The present invention is a hard disk drive which has a plurality of spring shaped contacts that electrically couple a printed circuit board to a flexible circuit board of an actuator arm assembly. The actuator arm assembly is located within an enclosed head-disk assembly (HDA) area of the disk drive. The printed circuit board is located in a separate enclosed printed circuit board (PCB) area of the drive. The contacts are mounted to a frame that separates the HDA area from the PCB area. The contacts extend from the frame and exert a spring force onto surface pads of both the flexible circuit board and the printed circuit boards to create an electrical connection between the boards.

BRIEF DESCRIPTION OF THE DRAWINGS

The objects and advantages of the present invention will become more readily apparent to those ordinarily skilled in the art after reviewing the following detailed description and accompanying drawings, wherein:

FIG. 3 is a cross-sectional view of the disk drive showing the contacts in contact with a flexible circuit board and a printed circuit board of the drive;

FIG. 4 is an enlarged perspective view of an alternate embodiment of the contacts.

DETAILED DESCRIPTION OF THE INVENTION

Figure 1:
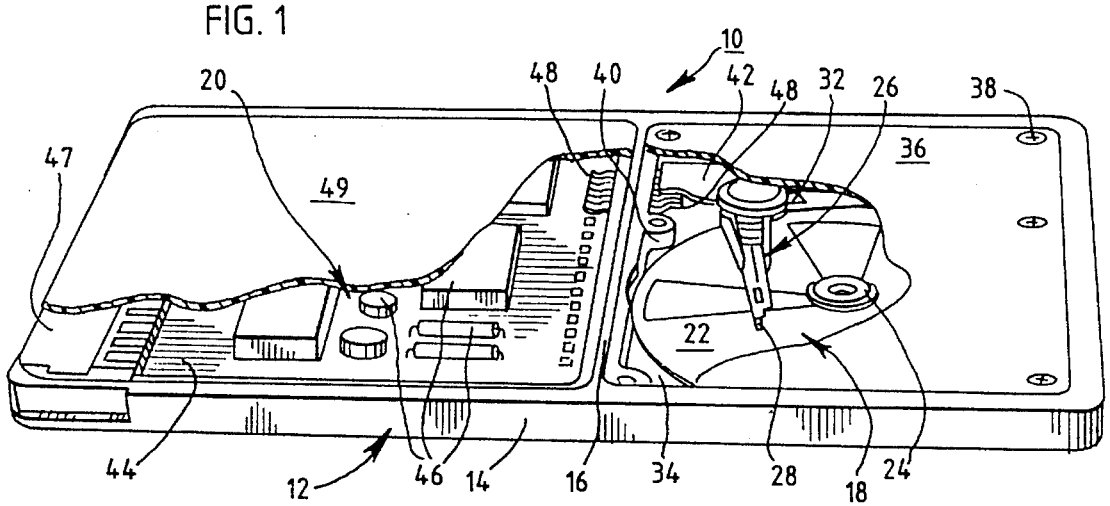
FIG. 1 is a perspective view of a hard disk drive of the present invention.

Referring to the drawings more particularly by reference numbers, FIG. 1 shows a hard disk drive 10 of the present invention. The disk drive 10 has a frame 12 that includes an outer wall 14 and a center section 16. The frame 12 is typically constructed from a molded plastic. The center section 16 separates a head-disk assembly (HDA) area 18 from a printed circuit board (PCB) area 20.

Within the hard disk area 18 is a disk 22 that is rotated by a spin motor 24. Also within the HDA 18 is an actuator arm assembly 26, which includes a transducer 28 mounted to an actuator arm 30. At the end of the actuator arm 30 is a voice coil motor 32. The voice coil motor 32 can create a torque on the arm 30 to move the transducer 28 across the surface of the disk 22.

The HDA is enclosed by a base plate 34 and a cover 36. The base plate 34 and cover 36 may be attached to the frame 12 by screws 38 that extend through lugs 40 in the frame 12. The disk drive is sealed by a gasket (not shown) located between the frame 12, the base plate 34 and the cover 36.

Attached to the actuator arm 30 and coupled to the transducer 28 is a flexible circuit board 42. The flexible circuit board 42 has a plurality of conductive traces (signal lines) that are typically encapsulated by flexible dielectric tape. In the preferred embodiment, the flexible circuit board 42 is mounted to the inside surface of the cover 36. The flexible circuit board 42 is typically bonded to the cover 36 by an adhesive or other similar means.

Within the printed circuit board area 20 is a printed circuit board 44. Mounted to the printed circuit board 20 are a plurality of electronic devices 46 that operate the drive 10. The electronic devices 46 are coupled to a connector 48 that is attached to the printed circuit board 44 and mounted to the frame 12. The PCB area may be enclosed by covers 49. The disk drive of the present invention preferably conforms with the specifications of the Personal Computer Memory Card International Association (PCMCIA). Accordingly, the outer dimensions of the drive are preferably 54 by 85 millimeters (mm). The thickness of the drive unit may be either 3.3 mm (PCMCIA type I), 5.0 mm (PCMCIA type II) or 10.5 mm (PCMCIA type III). The pins of the connector also conform with the PCMCIA specifications.

Figure 2:
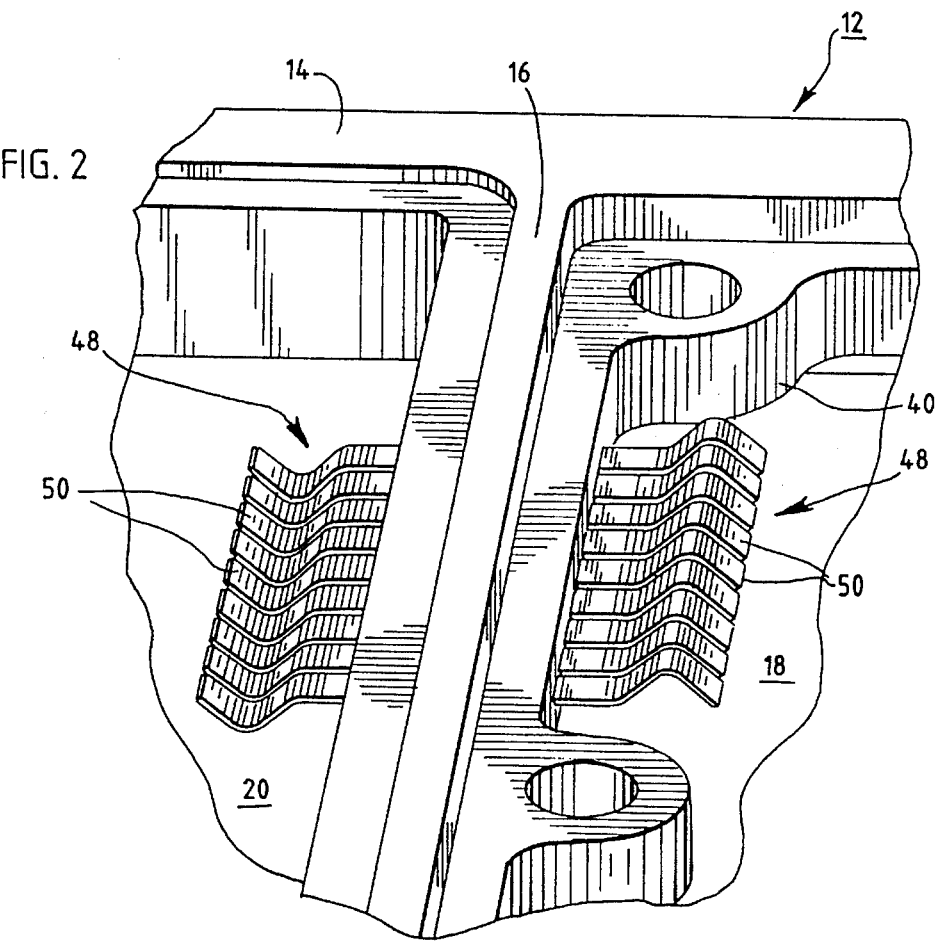
FIG. 2 is an enlarged perspective view of the contacts of the disk drive.

Mounted to the center section 16 of the frame 12 are a plurality of electrical contacts 48. As shown in FIG. 2, the contacts 48 each have spring shaped fingers 50 that extend into both the PCB area 20 and the HDA area 18. The contacts 48 extend through the center section 16 and are preferably installed during the molding process of the frame 12. In the preferred embodiment, the contacts 48 are constructed from copper, beryllium copper or any other material that is electrically conductive and has mechanical properties conducive to the formation and function of a spring.

As shown in FIG. 3, the contacts 48 are in contact with both the flexible circuit board 42 and the printed circuit board 44 to electrically connect the electronic devices 46 to the spin motor 24 and the transducer 28 of the actuator arm assembly 26. The fingers 50 of the contacts 48 are pressed against conductive pads 52 located on the top surface of the circuit boards 42 and 44. The dimensions and tolerances of the overall disk drive assembly are preferably established, such that the fingers 50 are deflected and pushed into contact with the conductive pads 52 of the flexible circuit board 42 when the cover 36 is attached to the frame 12. Likewise, the fingers 50 within the PCB area 20 are deflected and pressed into contact with the corresponding surface pads of the printed circuit board 44 when the board 44 is assembled to the frame 12. The PCB area may be enclosed by covers 49. The deflection of the fingers 50 should be enough to insure contact and prevent separation from the conductive surface pads even when the disk drive is subjected to external shock loads.

The contacts 48 of the present invention thus provide a means for connecting the actuator arm assembly to the printed circuit board without soldering or otherwise hard wiring the two boards together. The contacts also allow the printed circuit board to be decoupled from the flexible circuit without reheating solder.

FIG. 4 shows an alternate embodiment of the invention, wherein each end of a contact 48' has a pair of fingers 50'. The dual fingers 50' are typically used to grasp a printed circuit board with conductive pads on each surface of the board.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A hard disk drive, comprising:

a disk;

a spin motor that rotates said disk;

an actuator arm assembly coupled to said disk;

a flexible circuit that has a conductive pad connected to said actuator arm assembly;

a printed circuit board that has a conductive pad;

a frame that separates said printed circuit board from said disk, actuator arm assembly and flexible circuit; and, a substantially rigid contact mounted to said frame, said contact having a pair of spring fingers extending outwardly from said frame in opposite directions and biased onto said conductive pads of said flexible circuit board and said printed circuit board to electrically couple said flexible circuit board to said printed circuit board.

2. The hard disk drive as recited in claim 1, further comprising a cover attached to said frame, wherein said flexible circuit board is mounted to said cover.

3. The hard disk drive as recited in claim 2, wherein attachment of said cover to said frame causes said flexible circuit conductive pad to contact and deflect said spring finger, and said electrical coupling is solderless.

4. The hard disk drive as recited in claim 1, further comprising a connector coupled to said printed circuit board.

5. A hard disk drive, comprising:

a frame having an outer wall and a center section that define a head-disk assembly (HDA) area and a printed circuit board (PCB) area;

a disk located within said HDA area;

a spin motor that rotates said disk;

an actuator arm assembly coupled to said disk and located within said HDA area;

a pair of HDA covers that enclose said HDA area;

a flexible circuit board coupled to said actuator arm assembly and mounted to one of said HDA covers, said flexible circuit board having a conductive pad disposed adjacent said frame;

a printed circuit board located within said PCB area;

a pair of PCB covers that enclose said PCB area, said printed circuit board having a conductive pad disposed adjacent said frame;

a connector coupled to said printed circuit board; and, a plurality of substantially rigid contacts attached to said center section of said frame, said contacts each having a pair of spring fingers extending outwardly from said frame in opposite directions with at least one spring finger extending into said HDA area and at least one spring finger extending into said PCB area, said spring fingers biased into contact with said conductive pads of said flexible circuit board and said printed circuit board and electrically couple said flexible circuit board with said printed circuit board.

6. The hard disk drive as recited in claim 5, wherein said frame has outer dimensions of approximately 54 millimeters by 85 millimeters.

7. The hard disk drive as recited in claim 5, wherein each of said contacts are of unitary construction.

8. The hard disk drive as recited in claim 5, wherein the electrical connection of said flexible circuit board to said printed circuit board is solderless.

* * * * *